United States Patent [19]

Chohan

[11] Patent Number: 5,002,316
[45] Date of Patent: Mar. 26, 1991

[54] CANTILEVER LIP CONDUIT COUPLING MEMBER AND ASSEMBLY

[75] Inventor: Satish M. Chohan, Rockford, Ill.

[73] Assignee: The Gates Rubber Company, Denver, Colo.

[21] Appl. No.: 530,499

[22] Filed: May 17, 1990

Related U.S. Application Data

[63] Continuation of Ser. No. 326,593, Mar. 20, 1989, abandoned.

[51] Int. Cl.⁵ ............................................. F16L 17/00
[52] U.S. Cl. .................................. 285/110; 285/334.4; 285/354; 285/368; 285/917; 285/906
[58] Field of Search ................... 285/110, 334.4, 386, 285/332.1, 917, 354, 368, 906

[56] References Cited

U.S. PATENT DOCUMENTS

| | | | |
|---|---|---|---|
| 789,541 | 5/1905 | Hayes | 285/110 |
| 941,934 | 11/1909 | Marsh | 285/386 X |
| 1,017,813 | 2/1912 | Schuermann | 285/334.4 X |
| 1,137,955 | 5/1915 | Dies | 285/334.4 |
| 2,454,557 | 11/1948 | Jacobson | 285/122 |
| 2,545,168 | 3/1951 | Richardson | 285/334.4 |
| 2,652,268 | 9/1953 | Goode | 285/110 |
| 3,142,498 | 7/1964 | Press | 285/110 |
| 3,145,035 | 8/1964 | Handback | 285/334.4 |
| 3,191,973 | 6/1965 | Guarnaschelli | 285/110 |
| 3,266,822 | 8/1966 | Hinderer | 285/110 |
| 3,653,694 | 4/1972 | Nicol | 285/334.4 |
| 3,672,704 | 6/1972 | Christianson | 285/110 |
| 3,730,563 | 5/1973 | Handback et al. | 285/114 |
| 3,891,246 | 6/1975 | Hopper | 285/110 |
| 4,025,092 | 5/1977 | Wakefield | 285/94 |
| 4,103,937 | 8/1978 | Wakefield | 285/110 |
| 4,579,374 | 4/1986 | Bell | 285/334.4 |
| 4,705,306 | 11/1987 | Guido et al. | 285/332 |
| 4,747,606 | 5/1988 | Jennings | 277/182 |

FOREIGN PATENT DOCUMENTS

| | | | |
|---|---|---|---|
| 2031353 | 12/1971 | Fed. Rep. of Germany | 285/334.4 |
| 2427560 | 12/1975 | Fed. Rep. of Germany | 285/334.4 |
| 280931 | 5/1952 | Switzerland | 285/110 |
| 612094 | 6/1978 | U.S.S.R. | 285/110 |

OTHER PUBLICATIONS

I. D. Press; "Development Testing of Critical Hardware"; p. 2; Missiles & Space, Oct. 1961.

Primary Examiner—Dave W. Arola
Attorney, Agent, or Firm—H. W. Oberg, Jr.; C. H. Castleman, Jr.

[57] ABSTRACT

A conduit coupling member for use with a second coupling member, comprising: a generally tubular body having a bore along its longitudinal axis; an integral and portion of the body having a nose portion and an annular groove in the bore juxtaposed the nose portion which together define a cantilever lip deflectable at least partially in a direction of the longitudinal axis; and the nose portion having an outer surface, a portion of which effects a seal when the lip is longitudinally deflected.

19 Claims, 3 Drawing Sheets

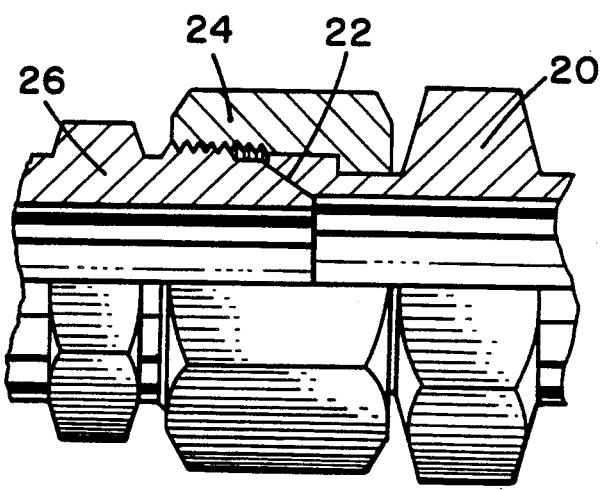
FIG. 1
PRIOR ART
FIG. 2
PRIOR ART
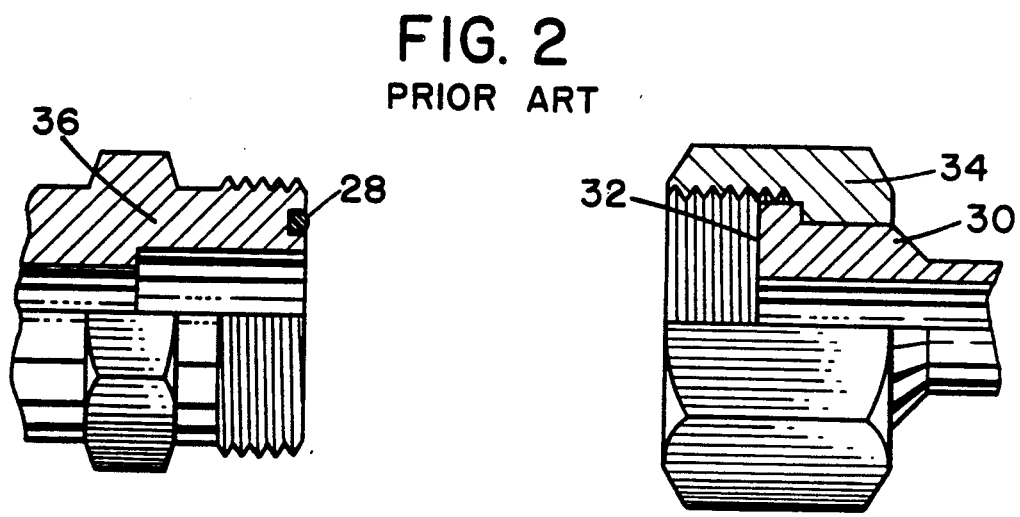
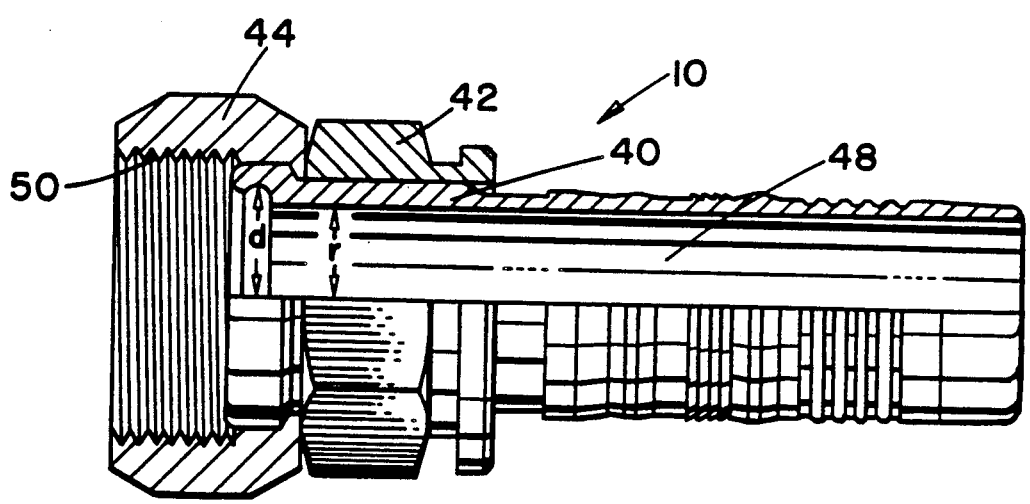
FIG. 3

CANTILEVER LIP CONDUIT COUPLING MEMBER AND ASSEMBLY

This application is a continuation of U.S. Pat. application Ser. No. 07/326,593 filed Mar. 20, 1989 now abandoned.

FIELD OF THE INVENTION

In general, this invention relates to a conduit coupling assembly member which can be used with a second coupling member to effect a metal-to-metal seal therebetween. More particularly, this invention relates to a high pressure conduit coupling member comprising a generally tubular body and an integral end portion of the body having a nose portion and an annular groove juxtaposed the nose portion which together define a cantilever lip deflectable at least partially in a direction of the longitudinal axis (of the body) when force is applied thereto by the tapered surface of a generally tubular frustoconical coupling member, sometimes referred to as a flare fitting.

DESCRIPTION OF THE PRIOR ART

The pipe and tube fittings described in U.S. Pat. No. 3,653,694 issued to Nicol, U.S. Pat. No. 3,672,704 issued to Christianson, U.S. Pat. No. 3,142,498 issued to Press, U.S. Pat. No. 3,891,246 issued to Hopper, and U.S. Pat. No. 4,025,092 issued to Wakefield have beams/protrusions configured so that the fittings with the beams can only be used with specially designed, uniquely shaped mateable fittings to form metal-to-metal seals. Since these beam-ended fittings are not designed for and cannot be used with standardized fittings, but instead require specially designed mateable fittings, they are costly to manufacture and costly to use. Each of the fittings disclosed in the above patents have thin beams/protrusions designed in such a way that tightening and untightening of the disclosed couplings will likely cause permanent plastic deformation and/or fracture of the protrusions.

The sealing lip of Nicol has a rounded or convex outer surface that contacts inwardly tapering inner seating surface of a female member to form a seal therebetween. The shoulder of the female member in contact with the nose portion acts as a tightening "stop" mechanism (tending to buckle the sealing lip outwardly) for the Nicol coupling assembly. This stop mechanism limits the amount of torque that can be applied to the assembly, thus, limiting the amount of force that can be applied to the sealing interface. The female member must have two precisely machined adjacent surfaces in order to create a seal with the male sleeve member as disclosed.

The Press and Christianson assemblies have lip-type projections each made up of an undercut and a thin deformable beam nose portion, whereby only the thin nose portions deform upon tightening of the assemblies. Each lip as designed acts as a tightening "stop" mechanism for the assembly making it difficult to obtain a good high pressure seal without fracturing the thin nose portion at its junction. Prior art assemblies having such stop mechanisms are not effective in producing a high pressure seal since the stop limits the amount of torque that can be applied to the assembly without destroying the lip-type projections.

O-ring face seal couplings and flare fittings are two well-known high pressure coupling systems often used to connect pieces of hydraulic conduit. Flare fittings attempt to create a high pressure seal by forcing two tapered (typically 37° or 45°) flat surfaces together, thus spreading the force applied to the coupling system over a relatively large sealing interface area. Since the sealing interface area is so large, this type of coupling system cannot withstand high internal pressures without leaking. Furthermore, both of the mating flat surfaces of flare face fittings must be precisely machined. Therefore, high pressure seals are difficult and costly to produce using such a coupling system. O-ring face seal couplings, which also have two precisely machined mating flat surfaces, have an indentation along the face of one fitting which can hold a rubber O-ring. The seal in such a coupling is created by forcing the O-ring against the flat face of a mateable fitting. The introduction of an O-ring into a coupling having mating flat surfaces increases the already high cost to manufacture such a coupling. O-ring couplings are, also, costly to maintain in use.

It is a primary object of this invention to produce a conduit coupling member capable of withstanding high internal pressures, by proper design of an integral end portion in the form of a deflectable cantilever lip, for use with a second coupling member to effect a seal between the two coupling members.

It is another object to produce a conduit coupling member mateable with a frustoconically shaped coupling member that has a generally tapered sealing surface, sometimes referred to as a flare fitting.

It is another object to produce a conduit coupling member by proper simplified design of a means for effecting a seal that minimizes the cost of production yet maximizes the number of times the conduit coupling assembly member can be disassembled and reassembled with a second coupling member to effect a seal therebetween.

SUMMARY OF THE INVENTION

Briefly described, the invention includes a conduit coupling member for use with a second coupling member, comprising: a generally tubular body having a bore along its longitudinal axis; means for effecting a seal comprising an integral end portion of the body having a nose portion and an annular groove in the bore juxtaposed the nose portion which together define a cantilever lip deflectable at least partially in a direction of the longitudinal axis; and the nose portion having an outer surface, a portion of which effects the seal when the lip is longitudinally deflected. Also, the invention includes a conduit coupling assembly, comprising: a generally tubular first element having a first bore along a first longitudinal axis; the first element comprising means for effecting a seal comprising an integral end portion of the first element having a bulbous nose portion and an annular groove in the first bore juxtaposed the bulbous nose portion which together define a cantilever lip deflectable at least partially in a direction of the first longitudinal axis; a generally tubular frustoconical second element having a second bore along a second longitudinal axis, a generally tapered annular sealing surface at an end thereof, and a threaded portion; means for applying force to the bulbous nose portion with the generally tapered annular sealing surface, to form an annular sealing interface therebetween; and the bulbous nose portion having an outer surface, a portion of which forms the sealing interface.

BRIEF DESCRIPTION OF THE DRAWINGS

The invention in its preferred embodiments will be more particularly described by reference to the accompanying drawings, in which like numerals designate like parts.

FIG. 1 is a partially sectioned side elevational view of a prior art 37° flare fitting assembly such as that used to connect pieces of hydraulic conduit.

FIG. 2 is a partially sectioned, exploded, side elevational view of a prior art O-ring face seal coupling which can be used to connect pieces of hydraulic conduit.

FIG. 3 is a partially sectioned side elevational view of a preferred conduit coupling member of the invention shown assembled with a partially sectioned ferrule locking collar and a fully sectioned nut.

DETAILED DESCRIPTION OF THE PREFERRED EMBODIMENTS

Figure 4:
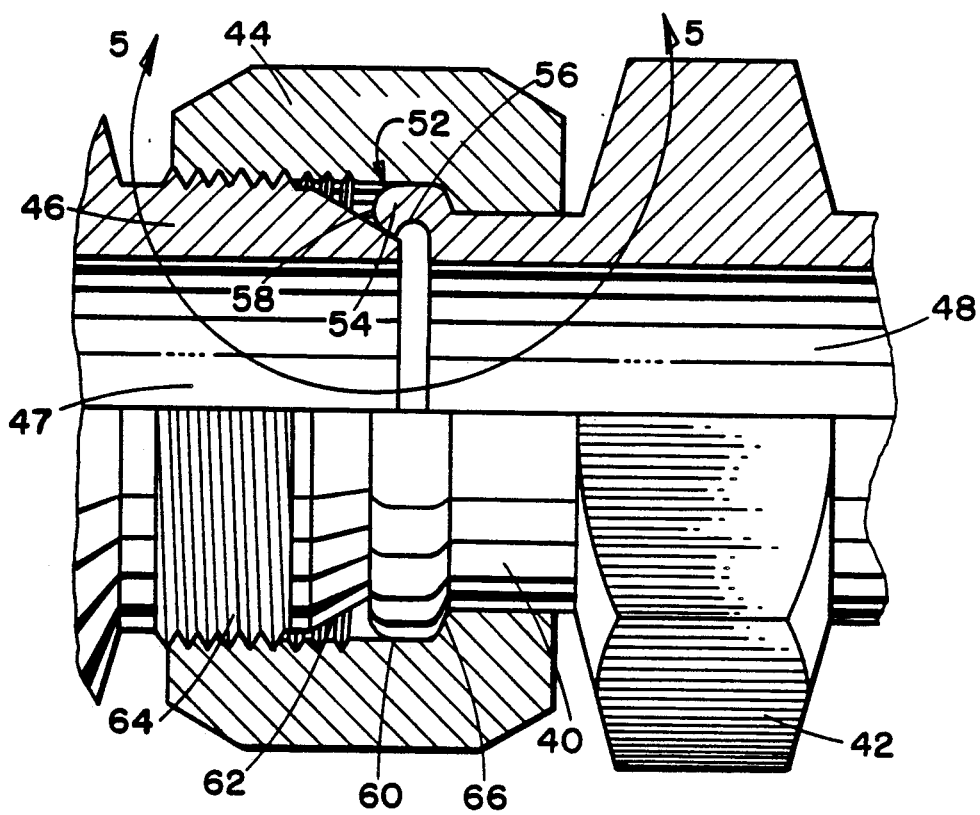
FIG. 4 is an enlarged view of the preferred conduit coupling member of FIG. 3 shown assembled with a partially sectioned 30° flare fitting and a fully sectioned nut.

The 37° flare fitting assembly of FIG. 1 includes a standard JIC 37° flare male fitting 26, a female fitting 20 having a corresponding precisely machined 37° inclined surface 22, and a nut 24 to apply force to the assembly to form a seal along the 37° mating interface. In order to produce a FIG. 1 fitting assembly capable of forming a seal, the 37° mating surfaces must each be machined within ±½ degrees of the 37° angled face. In addition to being costly to produce, the assembly pictured in FIG. 1 is limited in its ability to perform as a high pressure coupling particularly since torque applied to the assembly is spread over a large flat annular mating interface.

The O-ring face seal coupling of FIG. 2 includes male fitting 36 containing O-ring 28 made of natural or synthetic rubber or some other elastomer, female fitting 30 having a flat face 32 to contact O-ring 28, and nut 34 which is used to apply force to the mating interface to form a seal. Although somewhat more successful in producing a high pressure seal, the O-ring face seal coupling is very costly to produce.

The coupling assembly shown at 10 of FIG. 3 includes preferred conduit coupling member 40 having a bore 48 along its longitudinal axis, locking collar 42 surrounding coupling member 40, and nut 44 having threads 50.

FIG. 4 illustrates coupling member 40, partially threaded nut 44, and frustoconical conduit coupling member 46 having a bore 47, a tapered annular sealing surface 62, and threaded portion 64. For simplicity, the lines separating locking collar 42 from coupling member 40 have been omitted in the sectioned region of FIGS. 4, 5, and 6 so that both 42 and 40 are illustrated as one sectioned piece. Either coupling member 40 or 46 can be connected to pipe, hose, or a receptacle (none of which are shown) by way of interlocking threads, welding, brazing, crimping, fasteners, bolts, or any suitable engagement means. Thus, the coupling illustrated in FIG. 4 is not limited to connecting pieces of conduit but could connect a reservoir with a conduit or could directly connect two reservoirs. Integral to coupling member 40 is a cantilever lip end portion, shown generally at 52 and defined by nose portion 54 and annular groove 56 located in bore 48. Cylinder-like outer surface 60, sloped surface 66, and outer surface 58 of nose portion 54 further define the shape of end portion 52. Although shown as being negatively sloped (in a coordinate system with positive-y directed vertically upward and positive-x directed horizontally to the right), sloped surface 66 may be generally perpendicular to the longitudinal axis of coupling member 40 or it may be positively sloped (in the above coordinate system).

Figure 5:
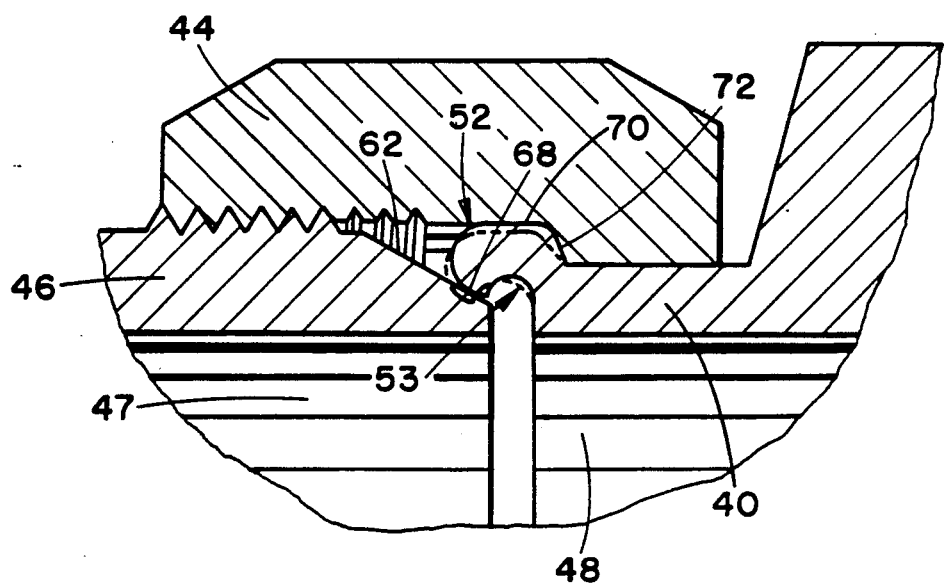
FIG. 5 is an enlarged sectional view of the assembly of FIG. 4 taken along 5—5.

FIG. 5 illustrates in greater detail the positioning of end portion 52 when the coupling members 40 and 46 are connected by nut 44 so that bores 47 and 48 are in communication. Illustrated in phantom at 53, is the end portion of coupling member 40 as it looks prior to the application of force by tapered annular sealing surface 62. The design of cantilever lip end portion 52 effectively utilizes the elastic properties of the material used to make conduit coupling 40: when force is applied to end portion 52 a preferably fluid-tight seal is formed by at least elastically deforming the end portion. Materials such as metals, metal alloys, or other suitable materials which have desired modulus of elasticity and rigidity characteristics can be used to fabricate coupling member 40.

Tightening nut 44 to force tapered annular sealing surface 62 against the outer surface 58 of nose portion 54 initially deflects nose portion 54 radially outward from (or in a direction generally perpendicular to) coupling member's 40 longitudinal axis. This forces cylinder-like outer surface 60 against inner seating surface 70 of the nut 44. An annular sealing interface 68 is formed between tapered annular sealing surface 62 and outer surface 58 of the nose portion. Further tightening of nut 44 deflects cantilever lip end portion 52 in a direction somewhat parallel to coupling member's 40 longitudinal axis tending to "curl" the end portion inward. Although sloped surface 66 is forced against shoulder surface 72 of nut 44, the cantilever lip end portion is left free to deflect longitudinally in a direction toward the annular groove 56 allowing for greater sealing pressures. Depending upon the slope of surface 66, shoulder surface 72 can be correspondingly negatively sloped as shown in FIG. 5 or it can be generally perpendicular to the longitudinal axis of coupling member 40, which would make it have an angle slightly different from the slope of surface 66. The longitudinal deflection of cantilever lip end portion 52 places it in bending: with tension resulting along outer surface 58 and cylinder-like outer surface 60, and compression resulting along the wall of annular groove 56.

Preferably, as shown, a substantial part of nose portion 54 is located a radial distance from the longitudinal axis of coupling member 40 greater than the inside radius r (for reference see FIG. 3) of bore 48. Nose portion 54 is shown as bulbous and outer surface 58 is shown as convex.

Although FIG. 5 illustrates a frustoconical conduit coupling member 46 having a 30° tapered annular sealing surface 62, the coupling member 40 as configured can be used with frustoconical conduit coupling members having tapered surfaces angled between preferably 29° to 51° from the longitudinal axis of bore 47. Thus, the preferred coupling members 40 and 80 (from FIG. 7) are versatile.

Figure 6:
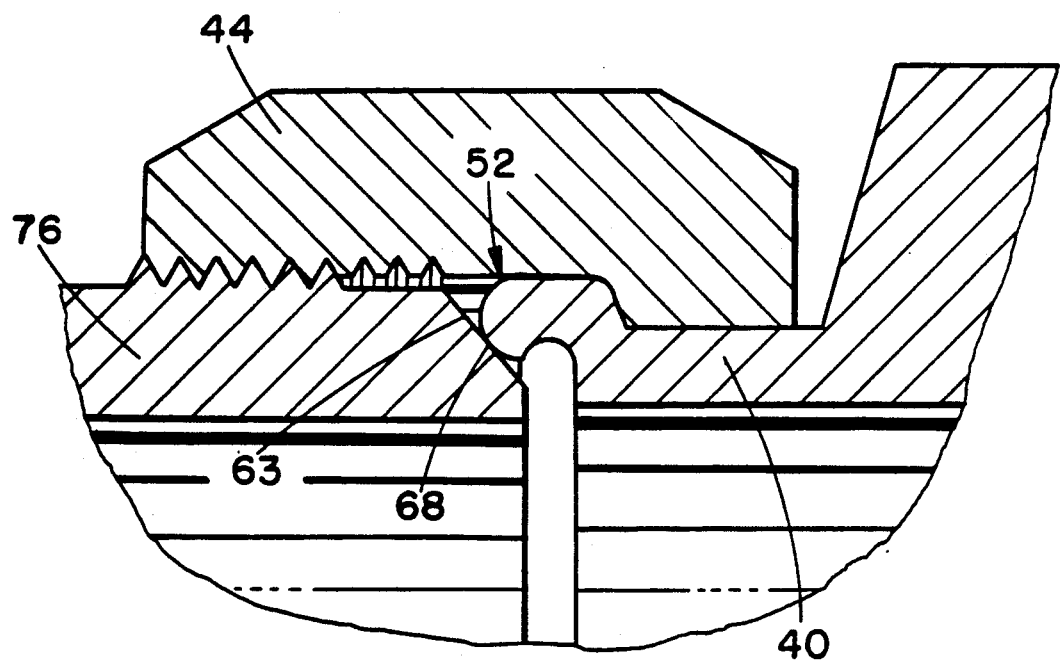
FIG. 6 is an enlarged sectional view of the assembly similar to that of FIG. 5, except that it illustrates a 50° flare fitting rather than a 30° flare fitting.

The area of sealing interface 68 is dependent upon: the shape, including the angle at the sealing interface, of outer surface 58; the shape, including the angle at the sealing interface, of tapered annular sealing surface 62; the tightening force or torque applied to the assembly; the material make-up of coupling members 40 and 46; the shape of end portion 52; and the shape, including angles, of inner seating surface 70 and shoulder surface 72. FIGS. 4, 5, 6 and 7 further show the location of annular sealing interface 68 with respect to distance d of FIG. 3 which is the maximum distance between the inside wall of annular groove 56 and the longitudinal axis of coupling member 40. The embodiments shown in FIGS. 4, 5 and 7 have a sealing interface located a radial distance from the longitudinal axis of coupling member 40 less than distance d of FIG. 3. FIG. 6 illustrates an embodiment having a sealing interface 68 located a radial distance from the longitudinal axis equal to and less than distance d. Although not necessary, it is preferable to minimize the radial distance from the longitudinal axis of sealing interface 68.

The area of sealing interface 68 is preferably less than the full area of either outer surface 58 or tapered annular sealing surface 62. Concentrating the tightening force or torque applied to the FIG. 5 assembly over a relatively small sealing interface area results in the formation of a seal capable of withstanding internal pressures that are higher than a seal formed by spreading the applied force or torque over the whole outer surface 58 and whole tapered annular sealing surface 62. It is estimated that for a given applied torque value, the pressure acting over the sealing interface area is at least five times as great for the FIG. 5 assembly than it is for the 37° mating interface of FIG. 1. More preferably, the sealing interface area of the FIG. 5 preferred embodiment is equal to or less than one-half the full area of tapered annular sealing surface 62. For example, a 1¼ inch diameter JIC 37° flare male fitting made of zinc plated steel having a tapered annular sealing surface 62 of cross-sectional length, as measured along the taper, nominally equal to 0.300 inches was assembled with nut 44 and coupling member 40 of FIG. 5 forming a sealing interface 68 of cross-sectional length, also measured along the taper, from about 0.028 inches to 0.056 inches. The cross-sectional length of sealing interface 68 depends upon the torque applied to the coupling assembly. Generally, for this example, as the torque applied to the coupling assembly was increased the cross-sectional length of sealing interface 68 increased.

Turning to FIG. 6, coupling member 40 is illustrated in an assembly with coupling member 76 having a 50° flare face 63. Tightening nut 44 will deflect end portion 52 in a manner similar to that described for the FIGS. 4 and 5 assembly.

Figure 7:
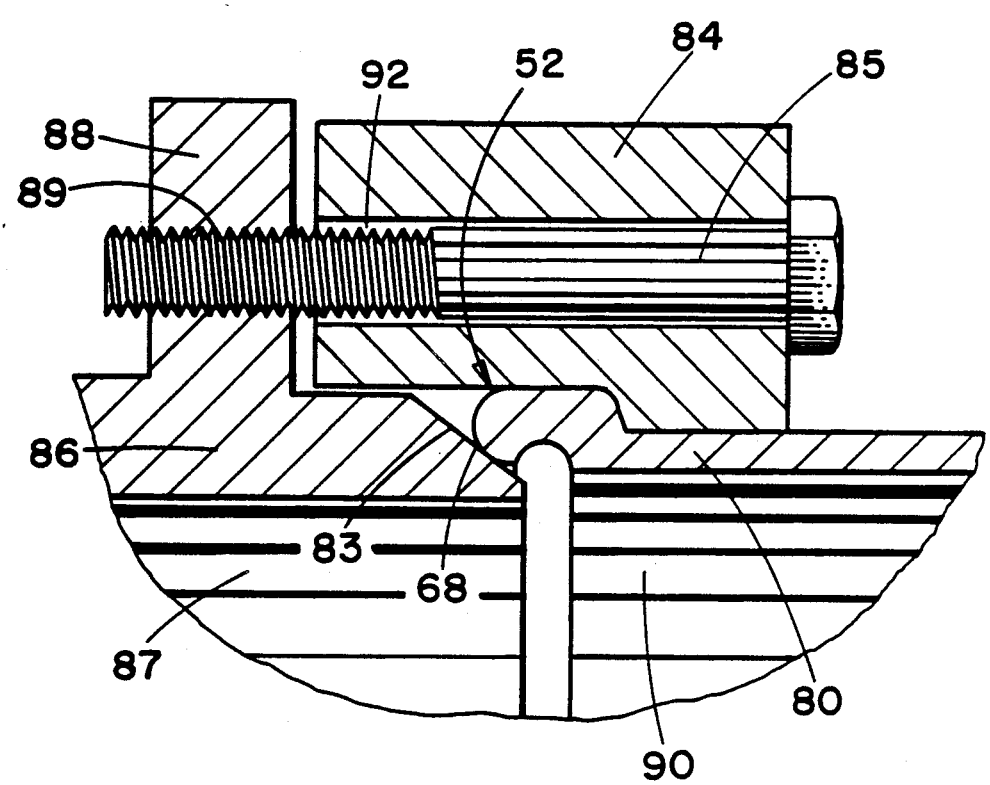
FIG. 7 is an enlarged sectional view, similar to that of FIG. 5, illustrating an alternative preferred assembly embodiment of the invention.

In FIG. 7, alternative preferred coupling member 80 is shown assembled with sleeve 84 and mating coupling member 86 having a 37° flare face 83 and outwardly extending projection 88. Bolts similar to that shown at 85 are used to connect coupling members 80 and 86 so that bores 87 and 90 are in communication. Bolts 85 are positioned through corresponding holes 92 in sleeve 84 generally equally spaced apart in a ring-like fashion. The bolts are then threaded into threaded holes 89 which are spaced along projection 88 to correspond with holes 92. Nuts or washers, not shown, may be used to secure the bolts 85 in place and to ensure that sufficient force is maintained over the area of annular sealing interface 68 to effect a seal. Projection 88 need not be shaped as a flange, but could be separate projections spaced to correspond with holes 92 to receive bolts 85. The deflection of end portion 52 of coupling member 80 under pressure as applied to the assembly by bolts 85, will occur in a manner substantially similar to that described for the FIGS. 4 and 5 assembly.

By way of example, a female coupling member made of unplated steel hardened to 80-95 HRB was fabricated with a shape similar to coupling member 80 of FIG. 7 to fit ½ inch diameter hydraulic hose. The following are dimensions of the fabricated member: radius r (for reference see FIG. 3) equals 0.203 inches; the arc radius of annular groove 56 (for reference see FIG. 4) was machined to 0.055 inches; outer surface 58 (for reference see FIG. 4) has a radius of 0.055 inches; and distance d (for reference see FIG. 3) equals 0.277 inches. A locking collar 42 (see FIG. 3) made of 0.875 inch hex stock unplated steel hardened to 80-95 HRB, and having an inside diameter of 0.552 inches, was fabricated to fit around coupling member 80. A partially threaded nut 44 (see FIG. 3) made of 0.875 inch hex stock unplated steel hardened to 80-95 HRB was used to connect coupling member 80 to a zinc plated steel JIC 37° flare male fitting similar to that shown at 26 in FIG. 1.

By way of a second example, a female coupling member made of unplated steel hardened to 80-95 HRB was fabricated with a shape similar to coupling member 40 of FIG. 3 to fit 1¼ inch diameter hydraulic hose. The following are dimensions of the fabricated member: radius r (FIG. 3) equals 0.531 inches; the arc radius of annular groove 56 (FIG. 4) was machined to 0.082 inches; outer surface 58 (FIG. 4) has a radius of 0.082 inches; and distance d (FIG. 3) equals 0.650 inches. A locking collar 42 (FIG. 3) made of 1.812 inch hex stock unplated steel hardened to 80-95 HRB, and having an inside diameter of 1.311 inches, was fabricated to fit around coupling member 40. A partially threaded nut 44 (FIG. 3) made of 2.000 inch hex stock unplated steel hardened to 80-95 HRB was used to connect coupling member 40 to a zinc plated steel JIC 37° flare male fitting similar to that shown at 26 in FIG. 1. This example female coupling member as fabricated can also be used with standard male flare fittings having tapered surfaces ranging from 30° to 50°, inclusive. Deformation of the cantilever lip end portion of an assembly made up of the immediately above-described components (according to the invention) torqued up to approximately 240 ft. lbs. is generally elastic. The torque specified for a prior art JIC 37° flare coupling, such as that shown in FIG. 1, typically used to connect 1¼ inch hydraulic hose is 120 ft. lbs. SAE square wave impulse tests were performed on both the prior art JIC 37° flare coupling and an assembly made up of the immediately above-described components (according to the invention). Below is a table containing the results of impulse tests conducted under the following conditions: hydraulic fluid was forced through the test coupling assembly at a pressure of 6650 lb/in² at 45 cycles/min.

| Coupling Type | Impulse Test Results | | |
|---|---|---|---|
| | Torque (Ft. Lbs.) | No. Cycles | Remarks |
| Prior Art 37° JIC | 90 | 229,700 | Leaked |
| According to invention | 90 | 1,230,000 | Test Discont'd. |

-continued

| | Impulse Test Results | | |
|---|---|---|---|
| Coupling Type | Torque (Ft. Lbs.) | No. Cycles | Remarks |
| Prior Art 37° JIC | 120 | 194,300 | Leaked |
| According to invention | 120 | 1,230,000 | Test Discont'd. |
| Prior Art 37° JIC | 180 | 1,230,000 | Test Discont'd. |
| According to invention | 180 | 1,230,000 | Test Discont'd. |

While certain representative embodiments and details have been shown for the purpose of illustrating the invention, it will be apparent to those skilled in this art that various modifications may be made to the invention without departing from the spirit or scope of the invention.

What is claimed is:

1. In a conduit coupling member for use with a second coupling member of the type having a substantially rigid frustoconical convex annular surface, the improvement comprising:
    a generally tubular body having a bore along its longitudinal axis;
    means for effecting a seal comprising an integral end portion of the body having a nose portion and an annular groove in the bore juxtaposed the nose portion which together define a cantilever lip deflectable against a relatively more rigid convex annular surface at least partially in a direction of the longitudinal axis;
    means for inhibiting radially outward deflection of the nose portion;
    the nose portion having an outer surface, a portion of which effects the seal when the lip is longitudinally deflected by the convex annular surface, the portion of the outer surface which effects the seal being convex curvilinear when viewed in axial cross-section; and
    means for deflecting the lip and for coupling the members together.

2. The conduit coupling assembly member of claim 1, wherein the integral end portion further comprises a substantially cylinder-like outer surface nearby the nose portion.

3. The conduit coupling member of claim 2, wherein the nose portion is bulbous.

4. The conduit coupling member of claim 1, wherein the annular groove has an inside wall and the portion of the outer surface which effects the seal comprises an annular interface area located a radial distance from the longitudinal axis that is less than the maximum distance between the annular groove inside wall and the longitudinal axis.

5. In a conduit coupling member for use with a second coupling member of the type having a substantially rigid frustoconical convex annular surface, the improvement comprising:
    a generally tubular body having a bore along its longitudinal axis;
    means for effecting a seal comprising an integral end portion of the body having a nose portion and an annular groove in the bore juxtaposed the nose portion which together define a cantilever lip located a radial distance from the longitudinal axis at least equal to the inside radius of the bore and at least partially deflectable in a direction of the longitudinal axis; and the nose portion having an outer surface, a portion of which effects the seal when the lip is longitudinally deflected by the relatively more rigid convex annular surface;
    means for inhibiting radially outward deflection of the nose portion; and
    means for deflecting the lip and for coupling the members together.

6. A conduit coupling assembly, comprising:
    a generally tubular first element having a first bore along a first longitudinal axis;
    the first element comprising means for effecting a seal comprising an integral end portion of the first element having a bulbous nose portion and an annular groove in the first bore juxtaposed the bulbous nose portion which together define a cantilever lip located at a radial distance from the first longitudinal axis at least equal to the inside radius of the first bore and deflectable at least partially in a direction of the first longitudinal axis;
    means for inhibiting radially outward deflection of the nose portion;
    a generally tubular second element having a second bore along a second longitudinal axis, a generally tapered and rigid convex annular sealing surface at an end thereof, and a threaded portion;
    means for coupling the members together and applying force to the bulbous nose portion with the generally tapered convex annular sealing surface to deflect the kip and form an annular sealing interface therebetween; and
    the bulbous nose portion having an outer surface, a portion of which forms the sealing interface and the lip being longitudinally deflected by the relatively more rigid convex annular sealing surface.

7. The coupling assembly of claim 6, wherein the first bore and second bore are in communication with a reservoir and a conduit.

8. The coupling assembly of claim 6 wherein the first bore and second bore are in communication with a first conduit end and a second conduit end.

9. The coupling assembly of claim 6, wherein the integral end portion further comprises a substantially cylinder-like outer surface nearby the bulbous nose portion and the means for applying force comprises an at least partially threaded nut having at least one shoulder surface.

10. The coupling assembly of claim 9, wherein the shoulder surface of the nut is sloped, the integral end portion further comprises a correspondingly sloped surface for contacting the shoulder surface, and the nut further comprises an inner seating surface for contacting the substantially cylinder-like outer surface of the end portion.

11. The coupling assembly of claim 9, wherein the shoulder of the nut is generally perpendicular to the first longitudinal axis, the integral end portion further comprises a surface for contacting the shoulder surface, and the nut further comprises an inner seating surface for contacting the substantially cylinder-like outer surface of the end portion.

12. The coupling assembly of claim 9, wherein the generally tapered convex annular sealing surface is angled between 29 degrees and 51 degrees from the second longitudinal axis.

13. The coupling assembly of claim 9, wherein the annular sealing interface is fluid-tight.

14. The coupling assembly of claim 13, wherein the ratio between the cross-sectional length of the fluid-tight annular sealing interface to the cross-sectional length of the generally tapered annular sealing surface is from about 0.093 (or 0.028/0.300) to 0.187 (or 0.056/0.300).

15. In a conduit coupling assembly of the type comprising a generally tubular first element having a first bore along a first longitudinal axis; a generally tubular second element having a second bore along a second longitudinal axis and a rigid, tapered convex annular sealing surface at an end thereof; and an at least partially threaded nut for connecting the first and second elements so that the first bore is in communication with the second bore, the improvement comprising:

the first element comprising means for effecting a seal comprising an integral end portion of the first element having a nose portion and an annular groove in the first bore juxtaposed the nose portion which together define a cantilever lip deflectable at least partially in a direction of the first longitudinal axis;

means for inhibiting radially outward deflection of the nose portion;

the nose portion having an outer surface, a portion of which effects the seal and the lip being longitudinally deflected by the relatively more rigid convex annular sealing surface when the members are coupled together with the nut, the portion of the outer surface which effects the seal being convex curvilinear when viewed in axial cross-section.

16. The conduit coupling assembly of claim 15, whereby tightening of the nut forces the nose portion against the tapered convex annular sealing surface forming a fluid-tight sealing interface of an area that is less than one-half the full area of the tapered annular sealing surface.

17. The conduit coupling assembly of claim 15, whereby applying a force over a portion of the nose portion's outer surface with the tapered convex annular sealing surface initially deflects the end nose portion in a direction generally perpendicular to the first longitudinal axis.

18. In a conduit coupling member for use with a second coupling member of the type having a generally tapered and rigid convex annular sealing surface at an end thereof, the improvement comprising:

a generally tubular body having a bore along its longitudinal axis:

means for effecting a seal comprising an integral end portion of the body having a nose portion and an annular groove in the bore juxtaposed the nose portion which together define an annular cantilever lip deflectable at least partially in a direction of the longitudinal axis;

means for inhibiting radially outward deflection of the nose portion;

the nose portion having an outer surface, a portion of which effects the seal when the lip is longitudinally deflected by the relatively more rigid convex annular sealing surface, the portion of the outer surface which effects the seal having a convex curvilinear cross-section parallel to the longitudinal axis; and means for deflecting the lip and for coupling the member together.

19. The conduit coupling member of claim 18 wherein the annular cantilever lip is located a radial distance from the longitudinal axis at least equal to the inside radius of the bore.

* * * * *